United States Patent
Pon

(10) Patent No.: US 6,556,615 B1
(45) Date of Patent: Apr. 29, 2003

(54) WIDE CORRELATED OPTIMIZED CODE MULTIPATH REDUCTION

(75) Inventor: Rayman W. Pon, Cupertino, CA (US)

(73) Assignee: Trimble Navigation, Ltd., Sunnyvale, CA (US)

( * ) Notice: Subject to any disclaimer, the term of this patent is extended or adjusted under 35 U.S.C. 154(b) by 0 days.

(21) Appl. No.: 09/545,302

(22) Filed: Apr. 7, 2000

Related U.S. Application Data

(63) Continuation-in-part of application No. 09/290,793, filed on Apr. 12, 1999, now abandoned, which is a continuation of application No. 08/783,616, filed on Jan. 14, 1997, now abandoned.

(51) Int. Cl.[7] .............................. H04B 1/69; H04K 5/01
(52) U.S. Cl. ........................ 375/130; 375/148; 375/346
(58) Field of Search ............................... 375/130, 317, 375/140, 150, 152, 147, 136, 346, 148; 342/357, 463, 450, 457, 417, 65

(56) References Cited

U.S. PATENT DOCUMENTS

| | | | | | |
|---|---|---|---|---|---|
| 4,894,662 A | * | 1/1990 | Counselman | .......... | 342/357.12 |
| 5,347,536 A | * | 9/1994 | Meehan | ....................... | 375/148 |
| 5,390,207 A | * | 2/1995 | Fenton et al. | .......... | 342/357.12 |
| 5,414,729 A | * | 5/1995 | Fenton | .................. | 342/357.12 |
| 5,576,715 A | * | 11/1996 | Litton et al. | ................. | 342/352 |
| 5,640,416 A | * | 6/1997 | Chalmers | ..................... | 375/147 |
| 5,729,571 A | * | 3/1998 | Park et al. | .................. | 375/149 |
| 5,734,674 A | * | 3/1998 | Fenton et al. | ................ | 370/342 |
| 5,917,866 A | * | 6/1999 | Pon | ............................. | 375/346 |
| 6,414,987 B1 | * | 7/2002 | Pon | ............................. | 375/148 |

* cited by examiner

*Primary Examiner*—Chi Pham
*Assistant Examiner*—Khai Tran
(74) *Attorney, Agent, or Firm*—Boris G. Tankhilevich

(57) ABSTRACT

The apparatus and method for the multipath pseudo-range error signal reduction using wide correlated optimized additional signals are disclosed. The wide correlated additional signals can be generated at different levels of the standard tracking channel to achieve the same result of minimizing the multipath signal. The additional signals are wide correlated and optimized during one-two chip periods.

14 Claims, 12 Drawing Sheets

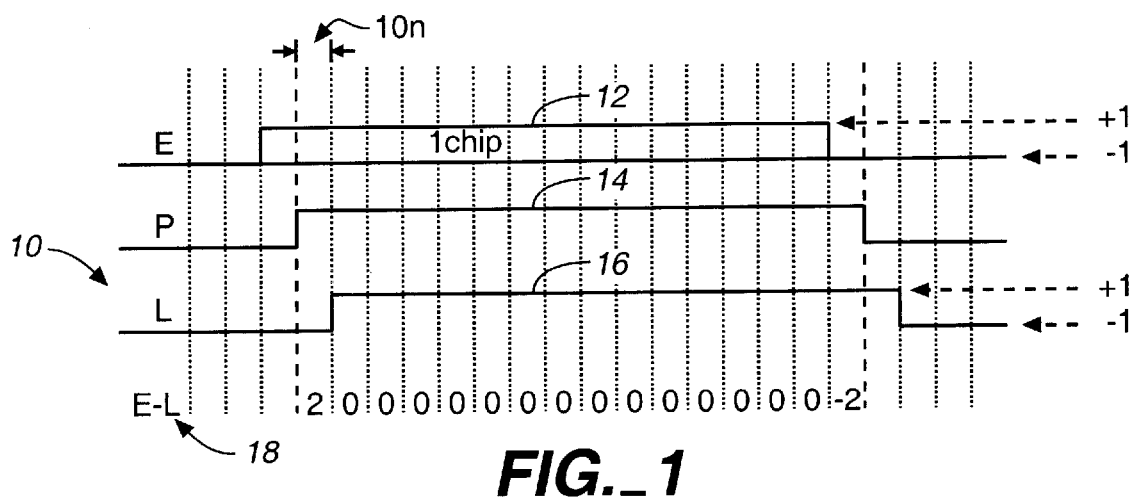
FIG._1
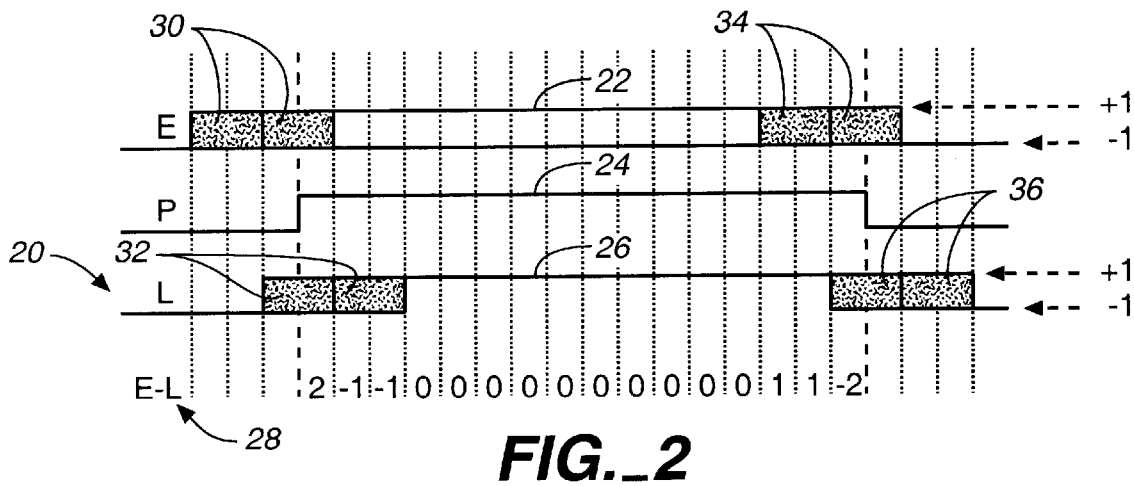
FIG._2
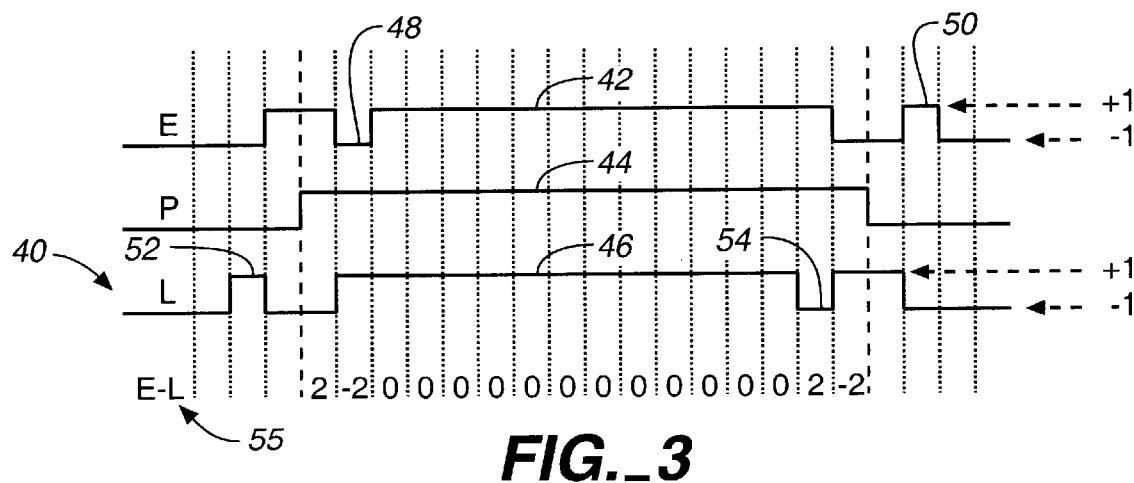
FIG._3

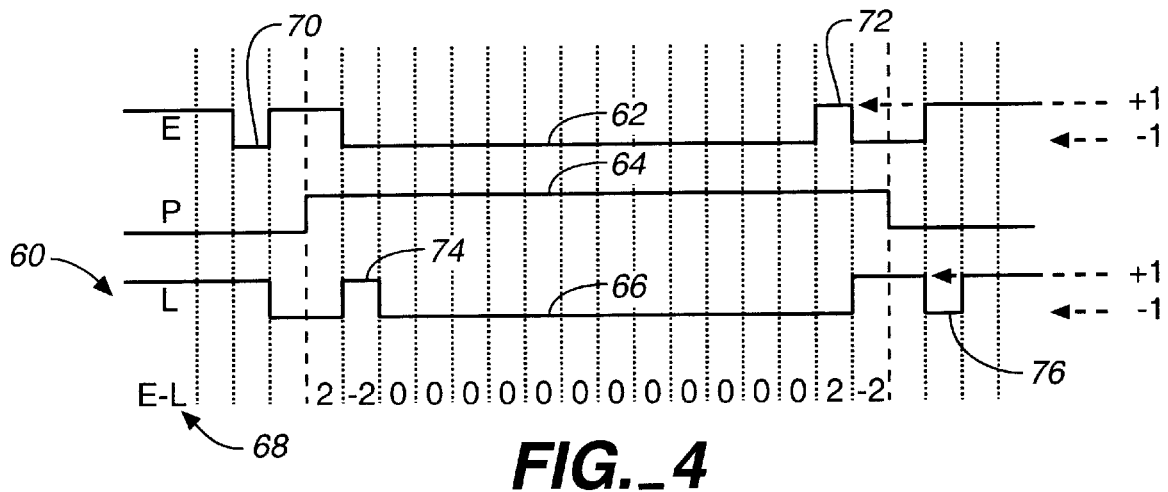
FIG._4
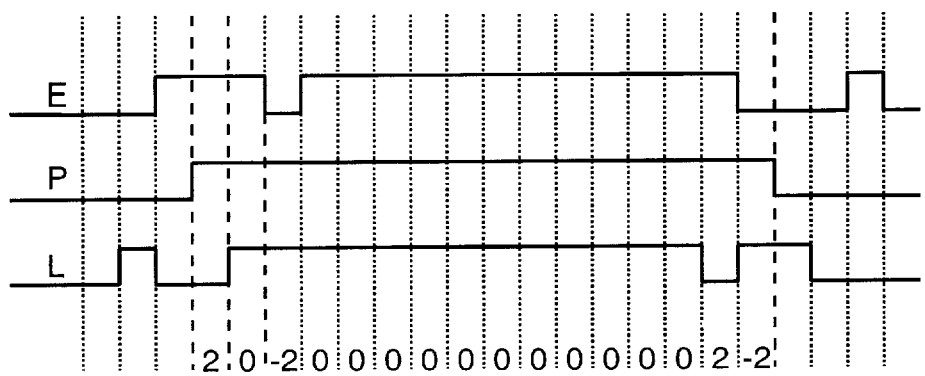
FIG._8

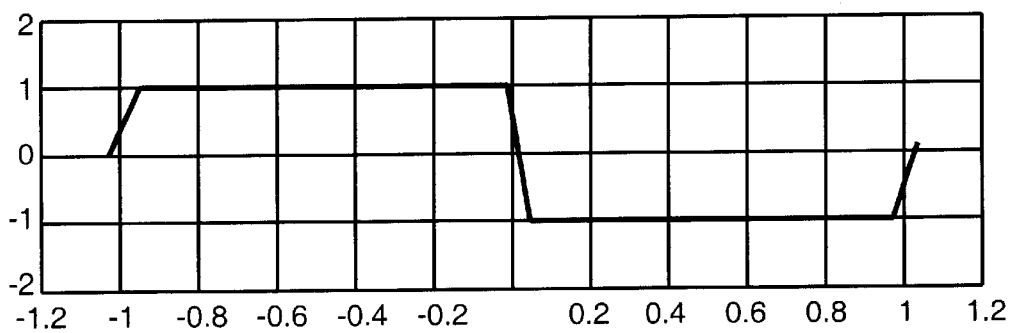
FIG._5
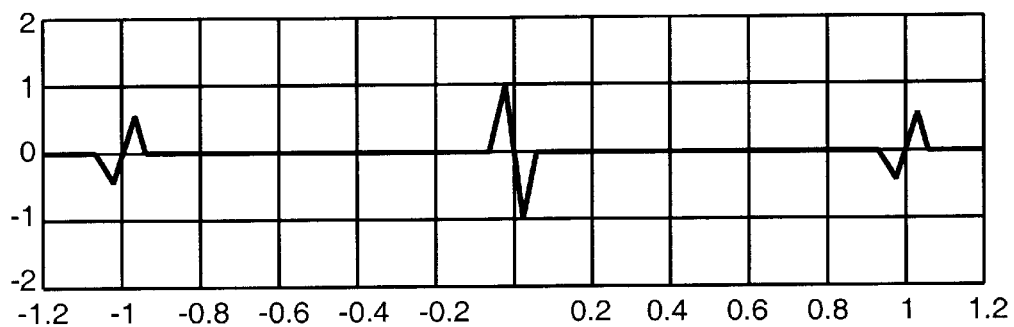
FIG._6
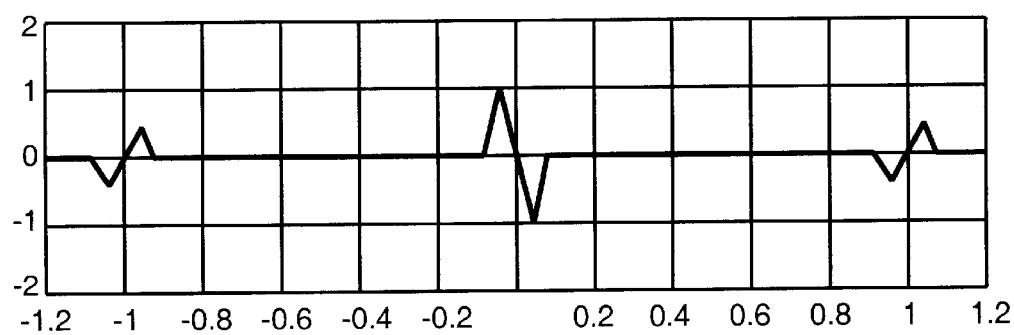
FIG._7

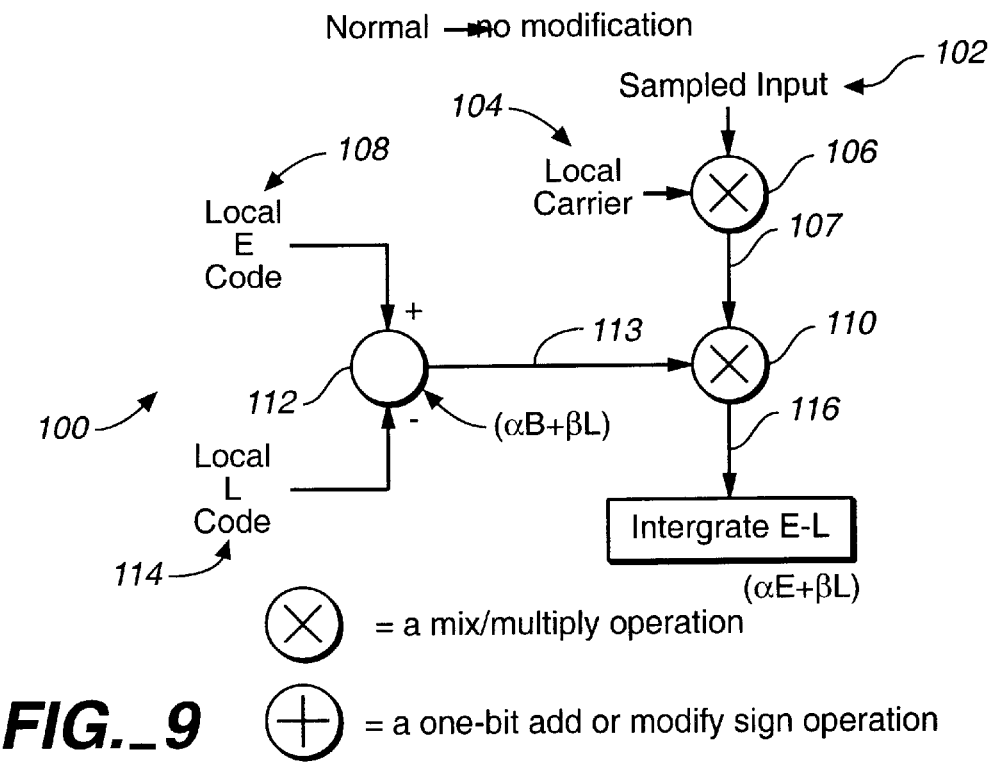
FIG._9
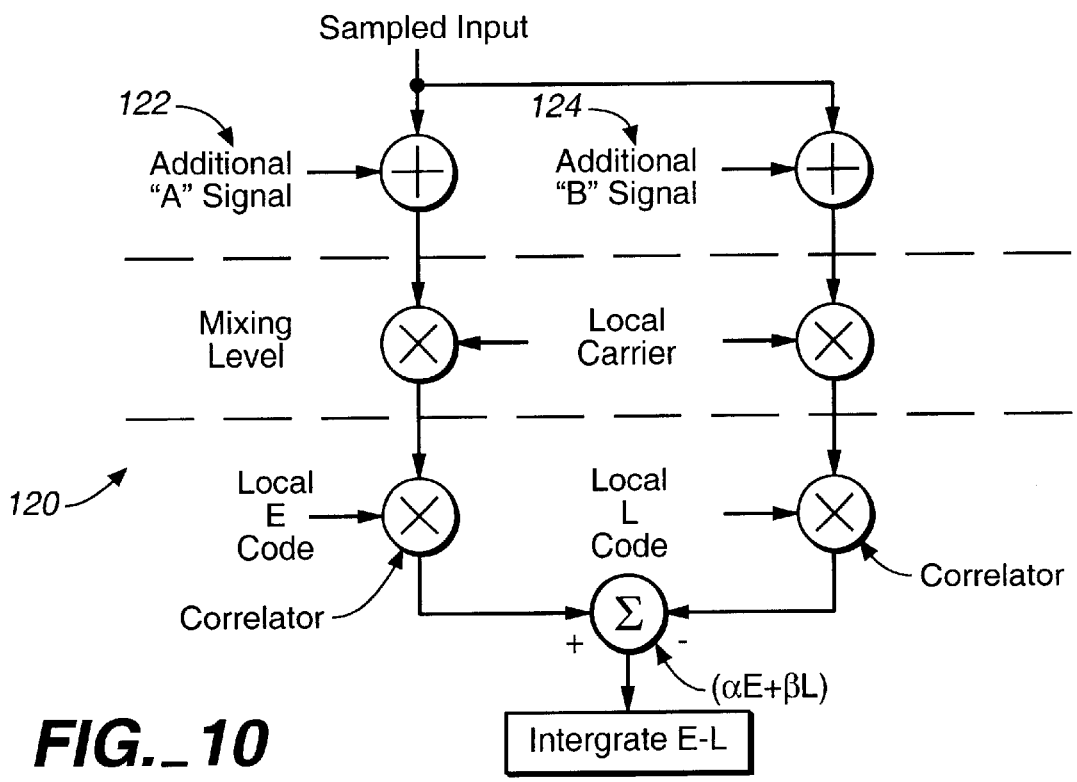
FIG._10

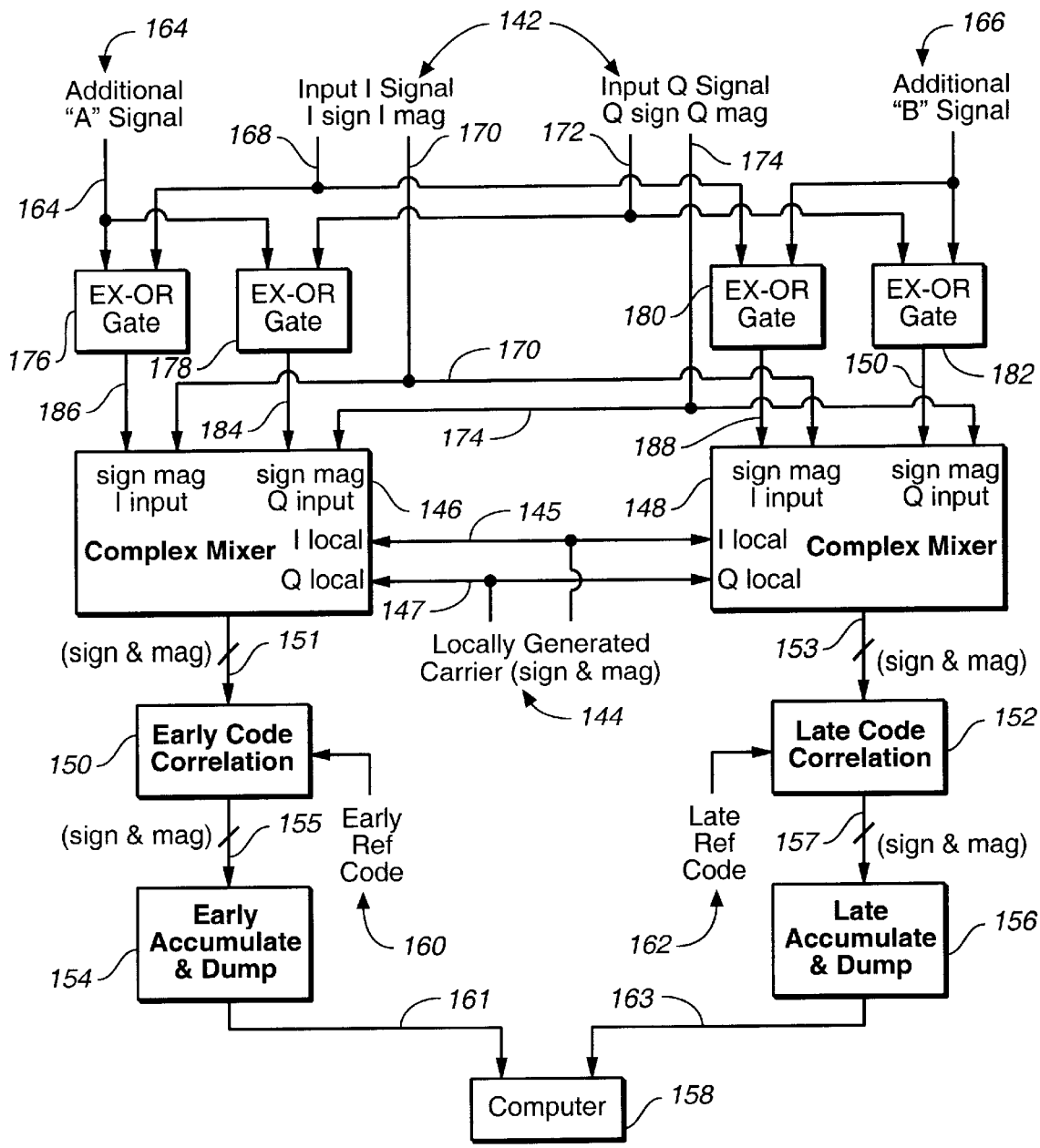
FIG._11

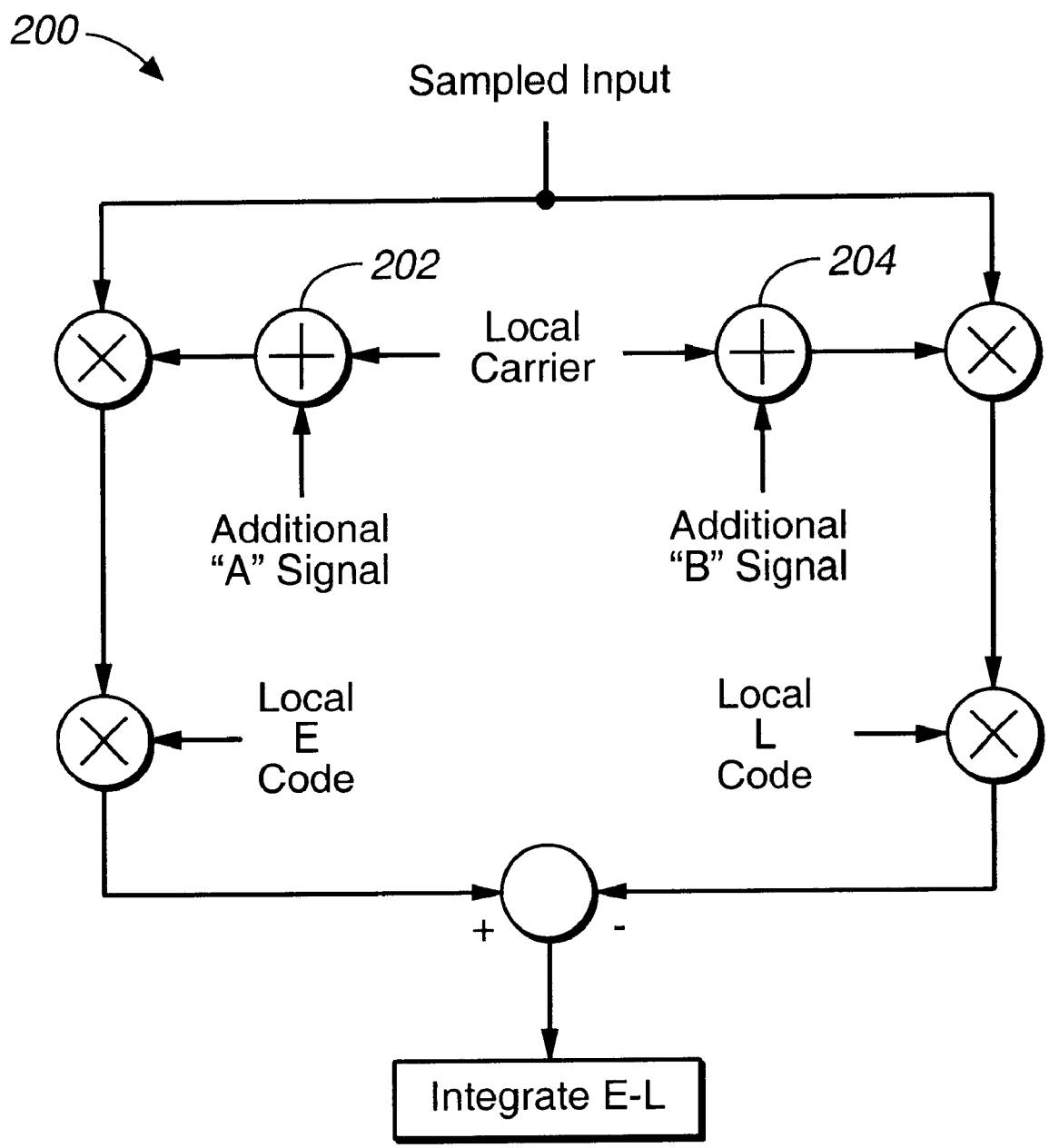
FIG._12

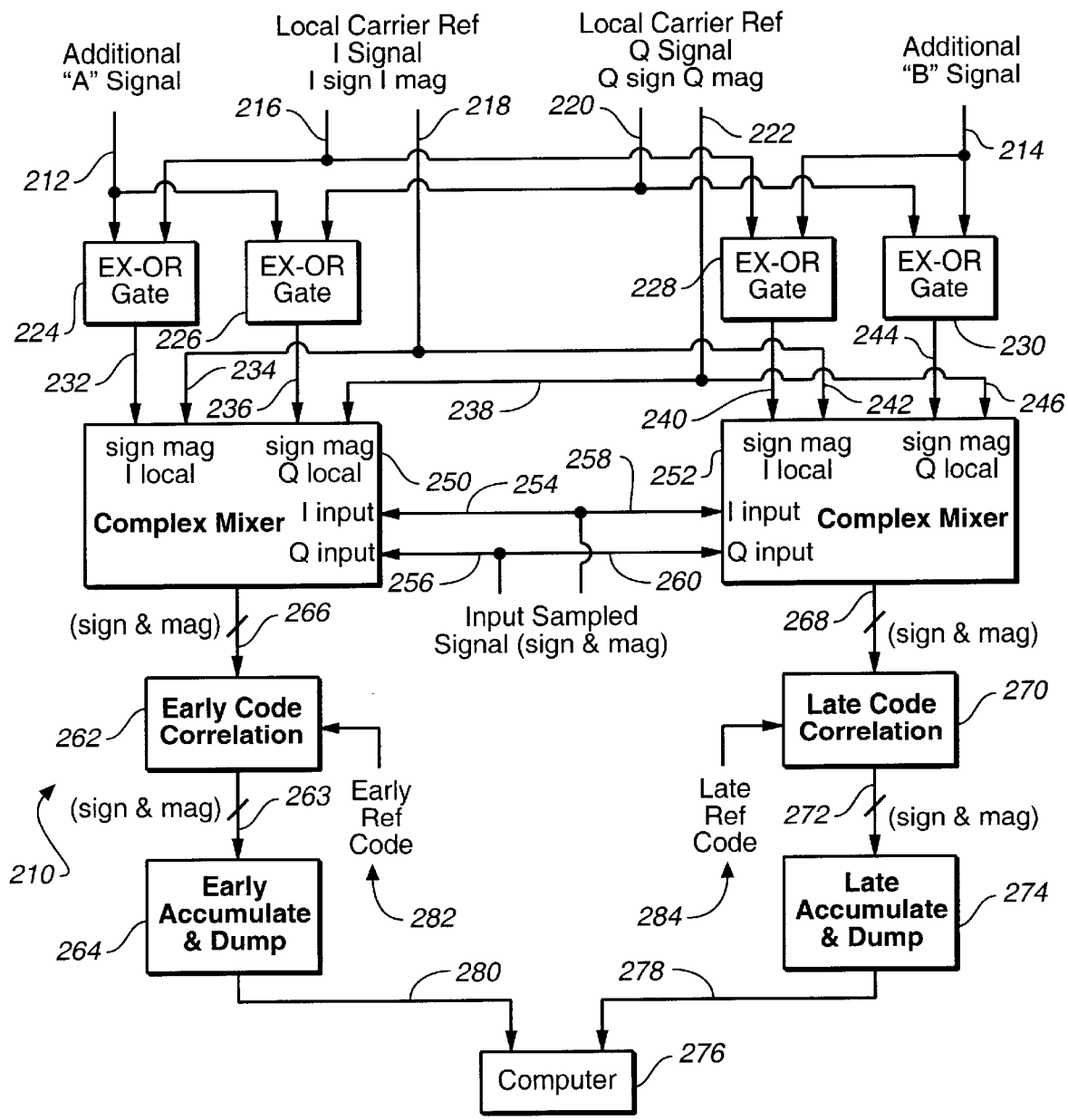
FIG._13

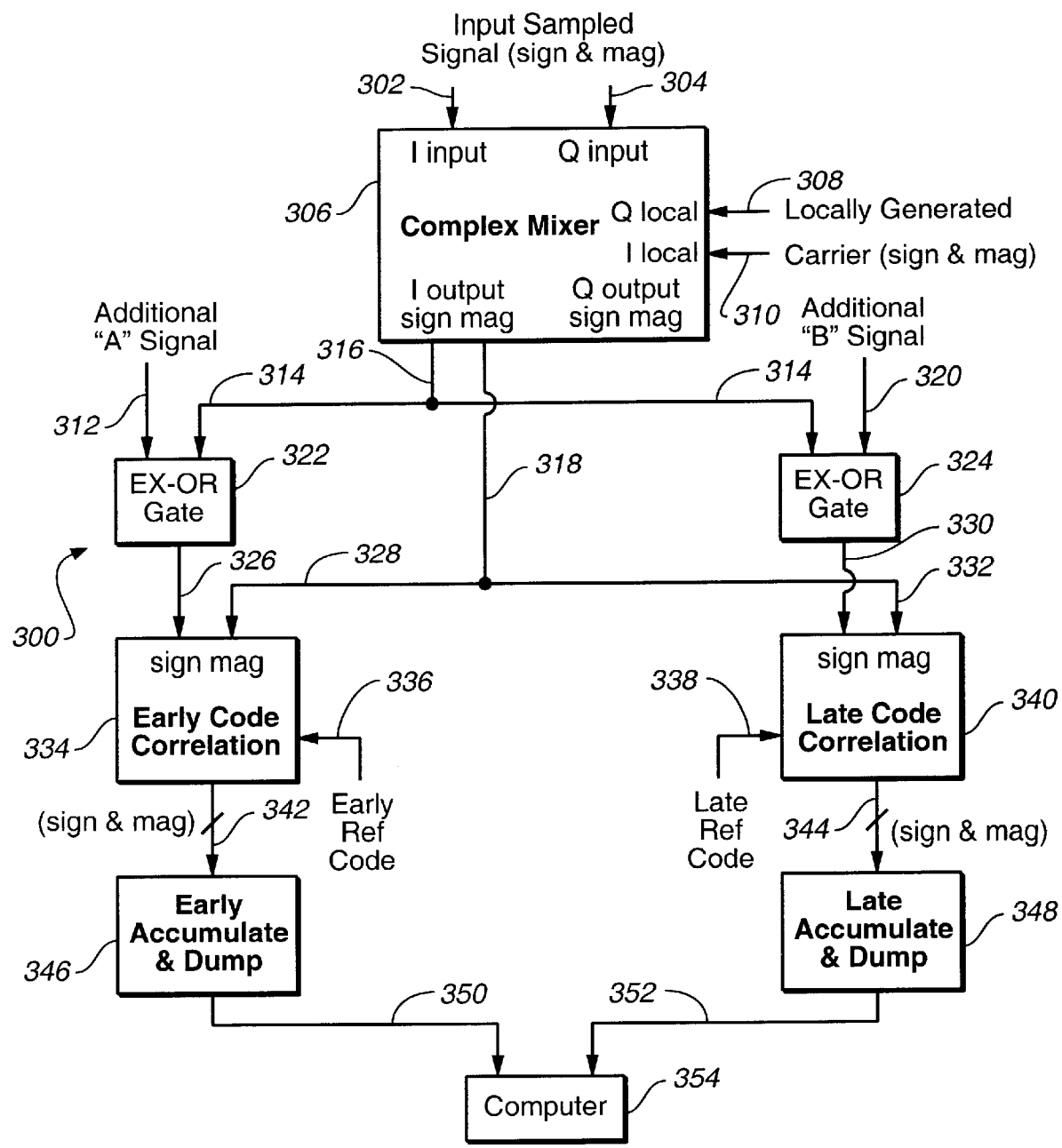
FIG._14

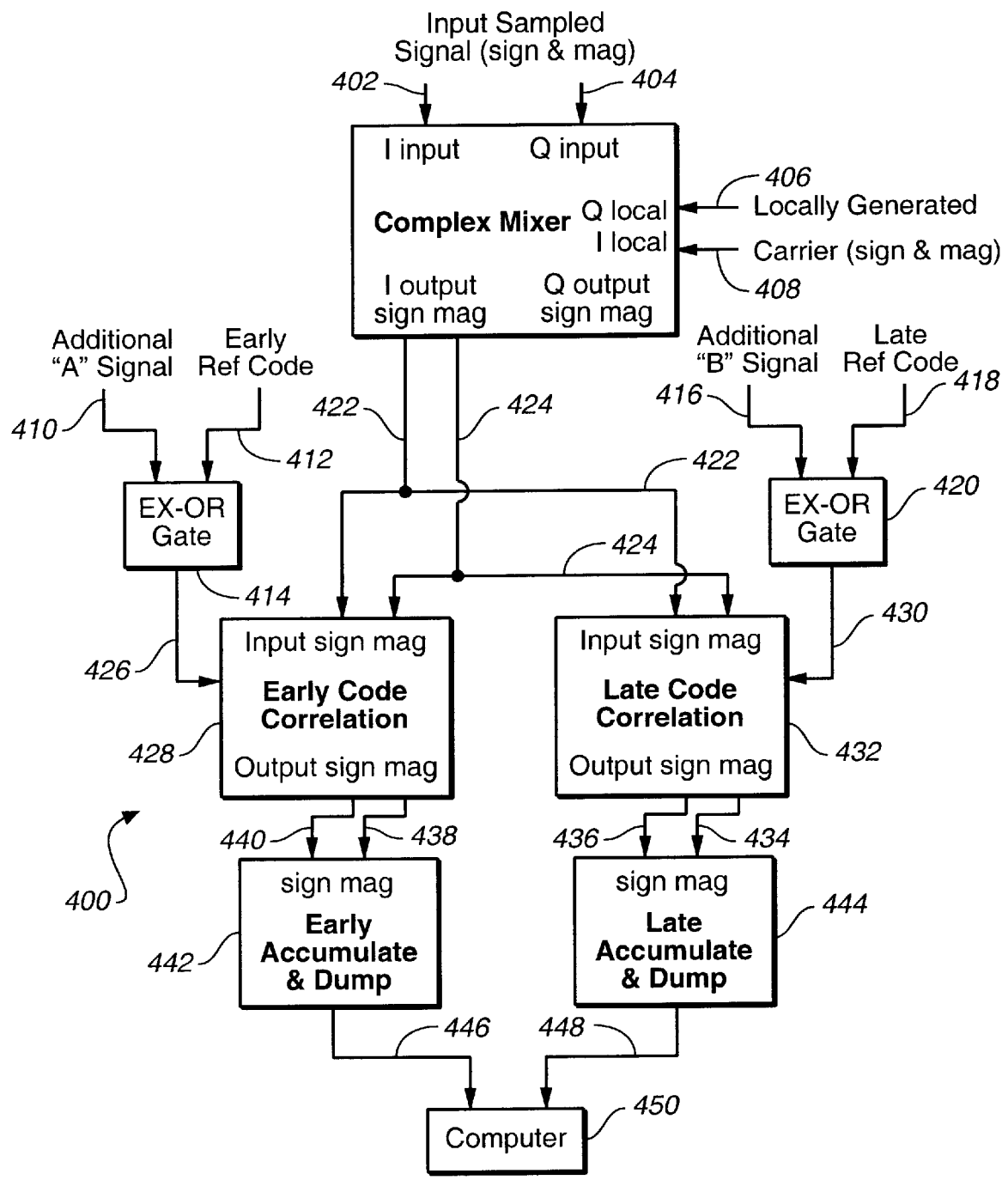
FIG._15

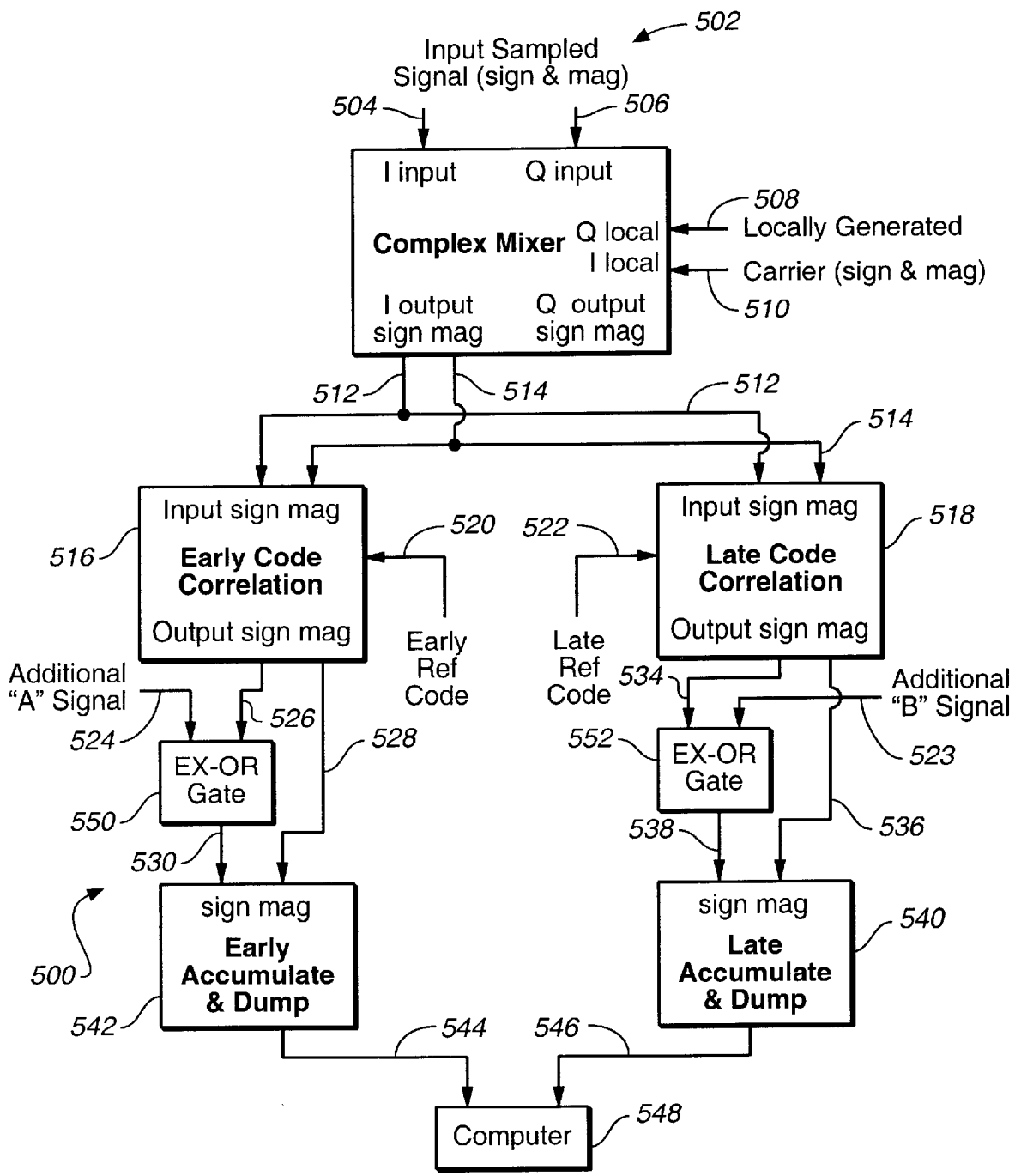
FIG._16

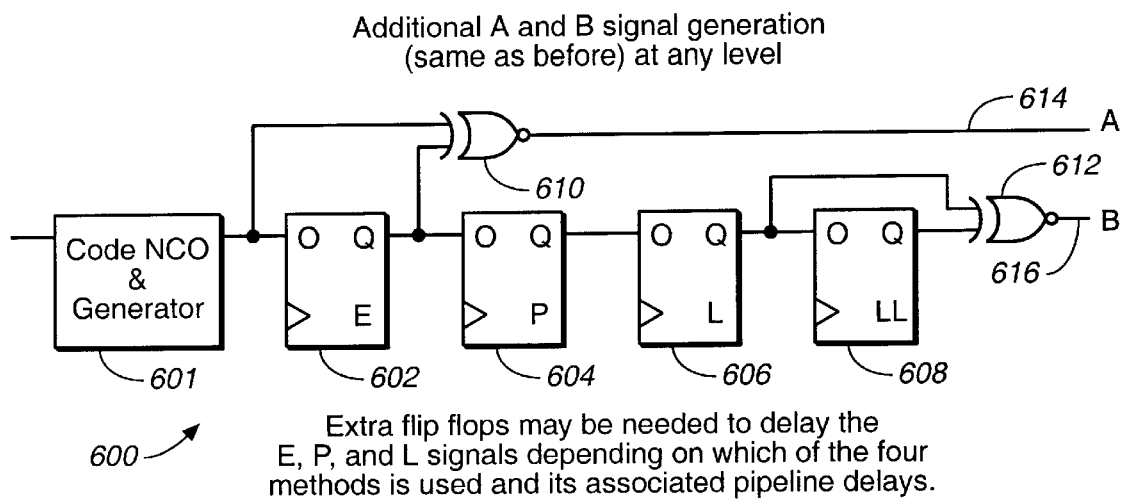
FIG._17
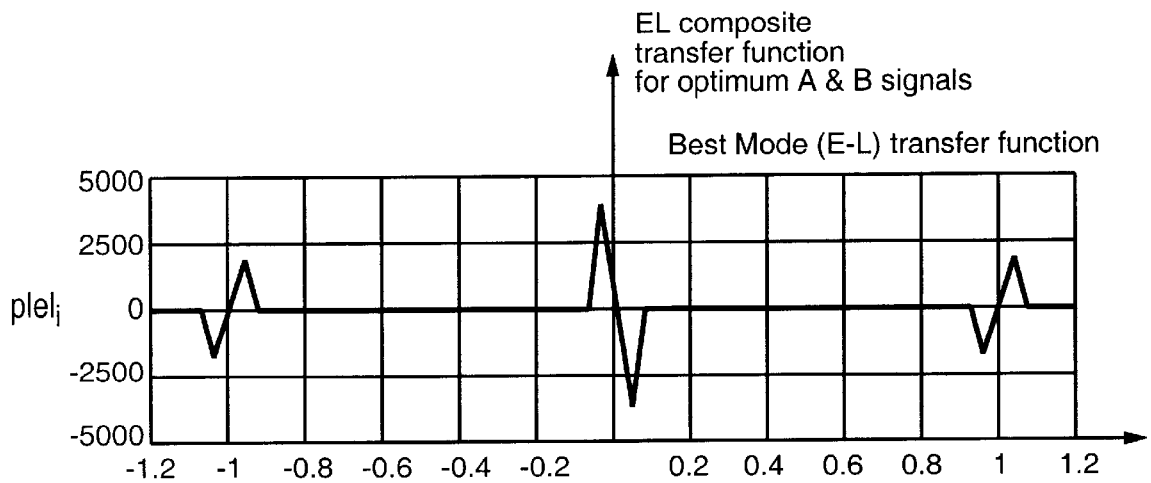
FIG._19
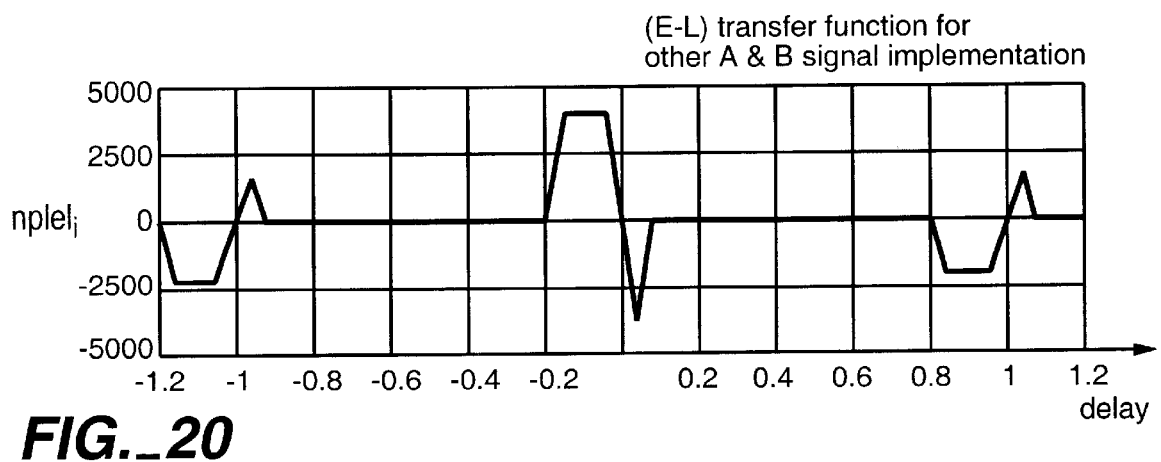
FIG._20

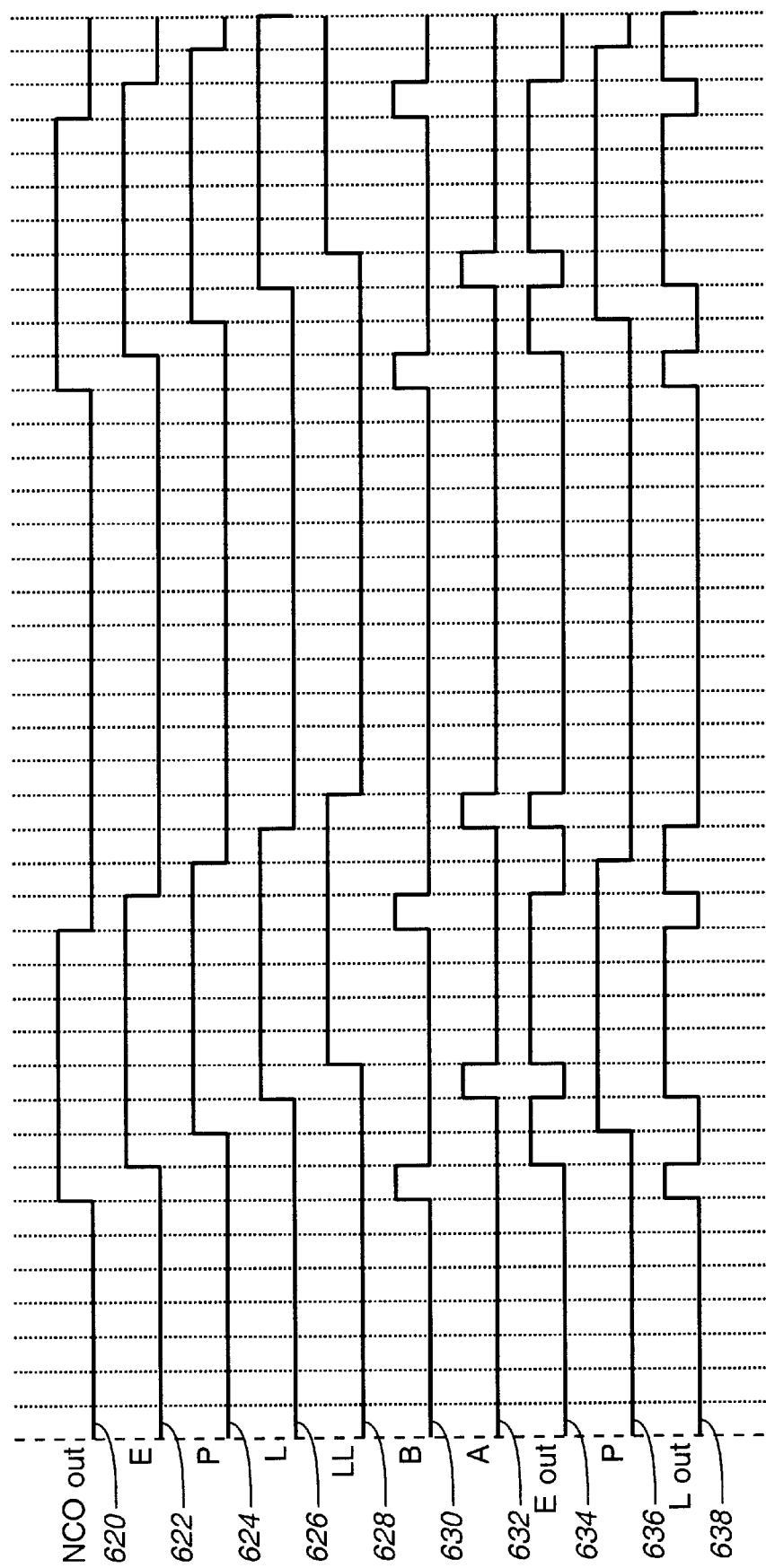

WIDE CORRELATED OPTIMIZED CODE MULTIPATH REDUCTION

This is the continuation-in-part of the U.S. patent application entitled "CODE MULTIPATH REDUCTION USING WIDE CORRELATED OPTIMIZED ADDITIONAL SIGNALS", Ser. No. 09/290,793, filed on Apr. 12, 1999, now abandoned which is the continuation of the parent U.S. patent application entitled "CODE MULTIPATH REDUCTION USING OPTIMIZED ADDITIONAL SIGNALS", Ser. No. 08/783,616, filed on Jan. 14, 1997 now abandoned.

BACKGROUND

1. Field of the Invention

The present invention relates generally to the field of Global Positioning System (GPS) receivers, and more specifically, to the field of GPS receivers that achieve significant reduction of the multipath error signals.

2. Description of the Background Art

In the available art related to GPS receivers, the multipath errors originate with contamination of GPS signals by delayed versions of these signals. For some applications using either pseudo-range or carrier phase observables, multipath is the dominant error source. The most direct approach for reducing this error is to select an antenna site distant from reflecting objects, and to design antenna/back plane combinations to further isolate the antenna from its surroundings. In some cases, however, antennas must be located in relatively poor sites, and other techniques for code multipath reduction are required.

In the U.S. Pat. No. 5,414,729, issued to Fenton, a receiver for pseudorandom noise (PRN) encoded signals is disclosed.

The Fenton receiver consists of a sampling circuit, multiple carrier and code synchronizing circuits, and multiple correlators, with each correlator having a selectable code delay spacing. The time delay spacing of the multiple correlators is distributed around an expected correlation peak to produce an estimate of the correlation function parameters which vary with respect to multipath distortion. This information may be used in turn to determine the offset estimates for locally generated PRN reference code and carrier phase tracking signals", Col. 3, lines 21–36. In another embodiment of the Fenton device, "the majority of the channels in a receiver can be left to operate normally, with one or more of the channels being dedicated to continuously sequencing from channel to channel to determine the multipath parameters for a partial PRN code being tracked", Col. 3, lines 44–49. Thus, the Fenton device includes a plurality of tracking satellite channels used to estimate the multipath parameters.

However, the Fenton device '729 includes a number of limitations. (1) The Fenton device does only tracking. After tracking, there is still a multipath blimp left in the correlation function that has to be removed by some other means. (2) The Fenton device uses the full correlation. Indeed, the Fenton device correlates through the entire chip period. (3) The Fenton device employs multiple correlators time delay spacing. This is equivalent to Early minus Late (E–L) response function that is limited to one chip time period. That is, the Fenton device is a "narrow correlator" device. If Fenton's (E–L) response function is not limited to only one chip time period and is extended over two chip periods, the Fenton device would not be beneficial over the prior art at all. (4) Using the filter function approach, the "narrow correlator" property of the Fenton device can be described as follows: the amplitude of the Fenton's filter function decreases when time increases between zero and two chip time periods.

Another such technique for code multipath reduction was disclosed by Rayman Pon in the U.S. Pat. No. 5,966,403, entitled "Code Multipath Error Estimation Using Weighted Correlations" that was assigned to the assignee of the present patent application, and that was filed on Jul. 19, 1996. This patent is specifically referred to in the present patent application and is incorporated herein by reference as patent #3. In the above referenced patent #3 a standard tracking channel was disclosed. The code multipath reduction in the above referenced patent #3 was based on the utilization of the weighting and correlation means in the standard tracking channel that changed the magnitude and shape of the composite signal autocorrelation function to estimate and suppress the contribution of a multipath signal. (1) In the above referenced patent #3, only code tracking is performed. However, a multipath blimp left in the correlation function after code tracking can be removed by using an additional circuitry, as disclosed in the current patent application. (See discussion below). (2) The patent #3 employs a partial weighted correlation function that is partially non-zero during one chip time period. (3) The patent #3 employs the "broad correlator" approach including an (E–L) response function that is not limited to one chip time period and can be extended up to two chip time periods. (4) Using the filter function approach, the "broad correlator" property of the device of the patent #3 can be described as follows: the amplitude of the filter function of the patent #3 is flat and does not change when time increases between zero and two chip time periods.

What is needed is the technique that allows to generate and use the additional signals to modify certain intermediate signals in the standard tracking channel in order to minimize the contribution of multipath signals.

SUMMARY OF THE INVENTION

To address the shortcomings of the available art, the present invention provides an apparatus and a method that allows to generate and use the additional signals to modify certain intermediate signals in the tracking channel in order to minimize the contribution of multipath signals.

One aspect of the present invention is directed to an apparatus for use in decoding a composite signal including a satellite signal from a satellite and including a multipath distortion component. The apparatus comprises: (A) a tracking satellite channel circuit for tracking the composite signal from the satellite; and (B) an additional circuit for generating an additional signal. The additional signal is used to minimize the multipath distortion component.

In one embodiment, the tracking satellite channel circuit further comprises: (1) an inphase (I) input circuit for processing the input composite signal from the satellite and for generating an inphase (I) component of the input composite signal; and (2) a quadrature (Q) input circuit for processing the input composite signal from the satellite and for generating a quadrature (Q) component of the input composite signal. In the first embodiment, the additional circuit further includes: (3) an additional input (A) circuit for modifying the inphase (I) component of the input composite signal at input level; and (4) an additional input (B) circuit for modifying the quadrature (Q) component of the input composite signal at input level.

In the alternative embodiment, the tracking satellite channel circuit further comprises: (1) an inphase (I) local carrier reference circuit for generating an inphase component (I) of a local carrier reference signal; and (2) a quadrature (Q) local carrier reference circuit for generating a quadrature component (Q) of a local carrier reference signal. The additional circuit in the second embodiment further includes: (3) an additional local carrier reference (A) circuit for modifying the inphase (I) component of the local carrier reference signal; and (4) an additional local carrier reference (B) circuit for modifying the quadrature (Q) component of the local carrier reference signal.

In one additional embodiment, the tracking satellite channel circuit further comprises (1) a complex mixer circuit for mixing an inphase component (I) and a quadrature component (Q) of a locally generated carrier signal with an inphase (I) component and a quadrature component (Q) of the input sampled signal and for generating an inphase (1) component of a baseband sampled composite signal. In this embodiment, the additional circuit further includes: (2) an additional local carrier mixing (A) circuit for modifying the inphase (I) component of the baseband sampled composite signal and for generating an Early baseband sampled composite signal; and (3) an additional local carrier mixing (B) circuit for modifying the inphase (I) component of the baseband sampled composite signal and for generating a Late baseband sampled composite signal.

Yet, in more embodiment, the tracking satellite channel circuit further comprises: (1) an Early code reference circuit for locally generating an Early code reference signal; and (2) a Late code reference circuit for locally generating a Late code reference signal. In this embodiment, the additional circuit further includes: (3) an additional local code reference (A) circuit for modifying the Early code reference signal; and (4) an additional local code reference (B) circuit for modifying the Late code reference signal.

Yet, in another embodiment, the tracking satellite channel circuit further comprises: (1) an Early code correlation circuit for correlating the inphase (I) component of the baseband sampled composite signal with the locally generated Early code reference signal and for generating an Early component of a composite correlation signal; and (2) a Late code correlation circuit for correlating an inphase (I) component of the baseband sampled input composite signal with the locally generated Late code reference signal and for generating a Late component of a composite correlation signal. The additional circuit in this embodiment further includes: (3) an additional correlation (A) circuit for modifying the Early component of the composite correlation signal; and (4) an additional correlation (B) circuit for modifying the Late component of the composite correlation signal.

In the preferred embodiment, the additional circuit further includes: (1) a code NCO & Generator for generating a local code signal; (2) an Early flip-flop for generating an Early signal; (3) a Punctual flip-flop for generating a Punctual signal; (4) a Late flip-flop for generating a Late signal; (5) an Late-Late flip-flop for generating a Late-Late signal; (6) a first EX-OR gate for generating a (B) additional signal; and (7) a second EX-OR gate for generating an (A) additional signal. The apparatus further includes a computer for closing a code and a carrier tracking loops, and for minimizing the multipath distortion component by optimizing the additional signals.

Another aspect of the present invention is directed to a method for decoding a composite signal including a satellite signal and a multipath distortion component. The method comprises the steps of: (1) tracking the satellite signal by a tracking channel; (2) generating additional signals by an additional circuit; and (3) minimizing the multipath distortion component by optimizing the additional signals by a computer.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts Early, Punctual, and Late signals for the normal E-L correlation.

FIG. 2 illustrates the Early, Punctual, and Late signals for the weighted E-L correlation.

FIG. 3 shows one embodiment of the Early, Punctual, and Late signals utilized by the present invention to achieve the multipath reduction.

FIG. 4 depicts another embodiment of the Early, Punctual, and Late signals employed by the present invention to achieve the multipath reduction.

FIG. 5 illustrates a E-L transfer function for the standard architecture of FIG. 1.

FIG. 6 shows a E-L transfer function for the weighted architecture of FIG. 2.

FIG. 7 depicts a E-L transfer function for the modified architecture of FIG. 3 and/or FIG. 4.

FIG. 8 illustrates a non-optimum embodiment of the Early, Punctual, and Late signals employed by the present invention to achieve the multipath reduction of FIG. 20.

FIG. 9 depicts a Standard Signal Processing Configuration.

FIG. 10 shows a Modified Configuration for Modified Sampled Input.

FIG. 11 is an illustration of the first embodiment of an apparatus wherein the input signal is modified.

FIG. 12 is a depiction of a tracking satellite channel circuit modified at locally generated carrier level.

FIG. 13 shows an apparatus for the second embodiment wherein the locally generated carrier signal is modified.

FIG. 14 illustrates an apparatus for the third embodiment of the present invention, wherein the carrier mixed signal is modified.

FIG. 15 depicts an apparatus for the fourth preferred embodiment of the present invention, wherein signals at the local reference code level are modified.

FIG. 16 shows an apparatus for the fifth embodiment of the present invention, wherein the correlated signals are modified.

FIG. 17 depicts a generator of additional signals.

FIG. 18 illustrates the additional signals A and B.

FIG. 19 depicts a E-L transfer function for the modified architecture of FIG. 3 and/or FIG. 4.

FIG. 20 depicts the (E-L) composite transfer function for not optimum additional signals A and B.

DETAILED DESCRIPTION OF THE PREFERRED AND ALTERNATIVE EMBODIMENTS

Reference to a Satellite Positioning System or SATPS herein refers to a Global Positioning System (GPS), to a Global Orbiting Navigation System (GLONASS), and to any other compatible satellite-based system that provides information by which an observer's position and the time of observation can be determined.

The Global Positioning System (GPS) is being developed and operated to support military navigation and timing needs at an estimated cost of about $8–10 billion. GPS represents an almost ideal dual-use technology and enjoys increased attention by civilians to explore its suitability for civil applications. The complete GPS system consists of 24 operational satellites and provides 24-hour, all-weather navigation and surveying capability worldwide. A major milestone in the development of GPS was achieved on Dec. 8, 1993, when the Initial Operational Capability (IOC) was declared as 24 satellites were successfully operating.

The implication of IOC is that commercial, national, and international civil users can rely on the availability of the Standard Positioning Service. Current policies quantify SPS as 100-meter, 95% position accuracy for a single user. Authorized (military) users will have access to the Precise Positioning Service (PPS), which provides a greater degree of accuracy. The PPS access is controlled by cryptographic means.

The GPS satellites transmit at frequencies L1=1575.42 MHZ and L2=1227.6 MHZ modulated with two types of codes and with a navigation message. The two types of codes are the C/A-code and the P-code. SPS is based on the C/A-code, whereas PPS is provided by the P-code portion of the GPS signal. The current authorized level of SPS follows from an intentional degradation of the full C/A-code capability. This measure is called selective availability (SA) and includes falsification of the satellite clock (SA-dither) and the broadcast satellite ephemeris (SA-epsilon), which is part of the navigation message. Despite selective availability, the C/A-code is fully accessible by civilians. On Jan. 31, 1994 the SA was finally implemented. The purpose of SA is to make the P-codes available only to authorized and military users. Users must be equipped with a decryption device or the "key" in order to lock on to P-codes. SA is implemented through a modification of the mathematical formula of the P-code using a classified rule. The encrypted P-code is referred to as the Y-code.

Two types of observables are of interest to users. One is the pseudo-range, which equals the distance between the satellite and the receiver plus small corrective terms due to clock errors, the ionosphere, the troposphere, and the multipath. Given the geometric positions of the satellites (satellite ephemeris), four pseudo-ranges are sufficient to compute the position of the receiver and its clock error. Pseudo-ranges are a measure of the travel time of the codes (C/A, P, or Y).

The second observable, the carrier phase, is the difference between the received phase and the phase of the receiver oscillator at the epoch of measurement. Receivers are programmed to make phase observations at the same equally spaced epochs. The receivers also keep track of the number of complete cycles received since the beginning of a measurement. Thus, the actual output is the accumulated phase observable at preset epochs. (The above-referenced discussion is provided in the book "GPS Satellite Surveying", Second Edition, authored by Alfred Leick, and published by John Wiley & Sons, Inc. in 1995; pp 1–3).

Both the SPS and PPS address "classical" navigation, where just one receiver observes the satellites to determine its geocentric position. Typically, a position is computed for every epoch of observation. However, in the surveying and geodesy applications the relative or differential positioning is used, wherein the relative location between the receivers is determined. In this case, many of the common mode errors cancel or their impact is significantly reduced. This is particularly important in the presence of selective availability.

As was mentioned above, the multipath errors originate with contamination of SATPS signals by delayed versions of these signals. For some applications using either pseudo-range or carrier phase observables, multipath is the dominant error source. The most direct approach for reducing this error is to select an antenna site distant from reflecting objects, and to design antenna/back plane combinations to further isolate the antenna from its surroundings. In some cases, however, antennas must be located in relatively poor sites, and other techniques for code multipath reduction are required.

Radio receivers for the SATPS navigation data bit stream are commonly referred to as correlation receivers. Correlation receivers are typically employed because they are designed for situations encountered in satellite broadcasting where the strength of the SATPS signal is quite weak compared to the noise level. In order to boost the weak signal without amplifying the noise, it is the practice to use spread spectrum modulation in SATPS satellite systems. A standard correlation radio receiver of the satellite signals includes a standard spread spectrum tracking channel.

A satellite signal generator includes a modulator that modulates the satellite transmission by the individual satellite identification code. This has the effect of spreading the satellite signal over a bandwidth that is determined by the reciprocal of the pulse width. A standard spread spectrum tracking channel includes a demodulator that multiplies the signal received on the ground by a replica of the individual satellite code. This kind of demodulation is generally known as correlation. A standard spread spectrum system including a standard spread spectrum tracking channel is fully described by M. Simon, J. Omura, R. Scholtz, and B. Levitt in the "Spread Spectrum Communications Handbook", McGraw-Hill, Inc., 1994. This book is incorporated by reference herein.

The spread spectrum demodulation (or correlation) can be achieved by employing a code tracking loop. Thus, the standard tracking channel includes the code tracking loop that employs a correlation process between two codes: the incoming code and the locally-generated replica code. To produce measurable signal power at the receiver, the incoming signal and the local replica are required to be aligned with each other within one cycle of the code clocking rate. This one cycle at the clocking rate is also referred to as "chip".

If the two codes are within one chip of each other, some measurable signal power will be observed at the output of the receiver correlator, and the closer the two codes are aligned, the greater is the power that will be observed. The relationship of the delay time between the two codes to the amount of signal power observed at the output of the correlation operation is called the autocorrelation function (AF). It will be appreciated that peak received power will be detected when the two codes are perfectly aligned in time.

The time-of-arrival measurement (or the code tracking) is used to calculate the pseudo-range, which is the first estimate of the distance between the receiver and a SATPS satellite. The carrier tracking allows one to obtain the second and more precise estimate of the distance between the receiver and a SATPS satellite.

As was mentioned above, the multipath errors originate with contamination of SATPS signals by delayed versions of these signals. For some applications using either pseudo-range or carrier phase observables, multipath is the dominant error source. A satellite signal including a multipath distortion component is called a composite signal. For the standard channel Early minus Late (E–L) correlation we have Early, Punctual, and Late replica signals spaced by some integer number of system clocks. When the Early minus Late subtraction is formed, a value of (+1) is assumed for a logic high state and a value of (−1) is assumed for a logic low state as depicted in FIG. 1. The signals are conveniently divided into individual clock bins, wherein each bin has the width of one system clock period. For each bin the Early minus Late value (18) is computed and shown at the bottom of the FIG. 1. The E–L transfer function corresponding to the standard architecture of FIG. 1 is shown in FIG. 5.

The multipath pseudo-range error signal can be almost completely eliminated after applying the techniques developed in the U.S. Patent applications entitled "Suppression of multipath signal effects" (patent application #1) and "Variable suppression of multipath signal effects" (patent application #2) filed on May 20, 1996. As was mentioned above, the specific implementations of various hardware (or software) circuits that can be used for purposes of the present invention were also fully disclosed by Rayman Pon in the patent #3 that is incorporated by reference herein in its entirety.

Thus, in the present patent application we only demonstrate in principle how the objectives of the present invention can be implemented in hardware (or software) circuits. The above referenced patent applications employed additional weighting circuits in the standard correlation tracking channel that changed the magnitude and shape of the composite signal autocorrelation function in order to estimate and suppress the contribution of a multipath signal.

With weighted Early minus Late correlation, when the weight is 1 only on the ends of the 1 chip period for both the Early and Late signals, the equivalent bin diagram is shown in FIG. 2. The shaded regions (30, 34, 32, 36) show where the Early and Late signals have a weight of 1. All other regions have a weight of 0 and are not used in the correlation. The value of the E–L function (28) is shown at the bottom of FIG. 2. The E–L transfer function corresponding to the weighted architecture of FIG. 2 is shown in FIG. 6. Thus, patent #3 employs a partial weighted correlation function that is partially non-zero during one chip time period. As was mentioned above, the patent #3 employs the "broad correlator" approach including an (E–L) response function that is not limited to one chip time period and is extended up to two chip time periods.

FIG. 3 for the Early, Punctual, and Late signals illustrates the main idea of the present invention. The value of the E–L function (55) of FIG. 3 is substantially identical to the weighted E–L function (28) of FIG. 2. This result can be achieved by modifying the Early (48) and Late (46) signals in the standard architecture. In one embodiment, the modified Early and Late signals contain extra pulses (48, 56, 52, 54) at appropriate places as compared with the Early and Late signals of standard architecture of FIG. 1. In another embodiment, the extra pulses (or additional signals 70, 72, 74, 76) can be generated in a different way as shown in FIG. 4. The E–L transfer function corresponding to the modified architecture of FIG. 3 and/or FIG. 4 is shown in FIG. 7, and the transfer function E–L corresponding to the modified architecture of FIG. 8 is shown in FIG. 20.

Thus, the current patent application employs the modified architecture of FIG. 8 that results in removing of a multipath blimp left in the correlation function after code tracking. More specifically, the current patent application employs the "broad correlator" approach including an (E–L) response function that, as shown in FIG. 20, is not limited to one chip time period and is extended up to two chip time periods. Thus, the present invention employs the generators of additional signals to modify certain intermediate signals in the standard tracking channel in order to minimize the contribution of multipath signals. The additional signals can be generated by a generator of additional signals at different levels of the standard tracking channel to achieve the same result of minimizing the multipath signal.

Using the filter function approach, this property of the device of the current patent application can be described as follows: the amplitude of the filter function of the apparatus of the current patent application is flat and does not change when time increases between zero and two chip time periods. Indeed, the pseudo baseband frequency of the incoming IF signal is at a certain frequency S. The local carrier numerically controlled oscillator (NCO) attempts to synthesize exactly this frequency to mix the IF signal to baseband to allow code correlation to occur. An inphase (I) signal and an out-of-phase quadrature (Q) signal are generated in this mixing process. The inphase (I) signal is used to estimate the signal power. The out-of-phase (Q) signal is used to maintain phase lock onto the satellite signal, and is maintained near zero.

The local carrier signal is generated on frequency L. When the local carrier signal is locked on the IF signal, the local signal frequency L is nearly identical to the satellite carrier frequency S without noise. By mixing the inphase and quadrature components $I_S$ and $Q_S$ of the input signal with the inphase and quadrature components of the locally generated carrier signal $I^L$ and $Q_L$, one can obtain the inphase and quadrature baseband components $I^B$ and $Q_B$ in the complex notation:

$$I_B + jQ_B = (I_S + jQ_S) \times (I_L + jQ_L) \quad (1)$$
$$= (I_S \times I_L - Q_S \times Q_L) + j(I_S \times Q_L + I_L \times Q_S);$$

wherein $j^2 = (-1)$.

Equation (1) can be rewritten in the following way:

$$I_B = (I_S \times I_L - Q_S \times Q_L); \quad (2)$$

and $$Q_B = (I_S \times Q_L + I_L Q_S); \quad (3)$$

The input signal as well as the locally generated carrier has at least a sign bit along with some magnitude bits. After the mixing process, the inphase or quadrature baseband components $I_B$ and $Q_B$ have a sign bit along with some magnitude bits, wherein the baseband number of magnitude bits is a sum of the input signal number of magnitude bits and the locally generated carrier number of magnitude bits.

After the mixing process is completed, the inphase baseband component $I_B$ is correlated with the 1 bit locally generated code, wherein 1 bit=sign bit plus zero magnitude bits. The quadrature baseband component $Q_B$ is used to close the carrier tracking loop. For the Early and Late correlation signals, we have the following equations:

$$E \text{ correlation signal} = E \text{ local code} \times I_B \text{ mixing} \quad (4)$$
$$= E \text{ local code} \times (I_S \text{ input} \times I_L \text{ local carrier} -$$
$$Q_S \text{ input} \times Q_L \text{ local carrier});$$

$$L \text{ correlation signal} = L \text{ local code} \times I_B \text{ mixing} \quad (5)$$
$$= L \text{ local code} \times (I_S \text{ input} \times I_L \text{ local carrier} -$$
$$Q_S \text{ input} \times Q_L \text{ local carrier});$$

wherein we substituted $I_B$ signal by equation (2).

All signals in the entire processing chain involve a sign bit and zero or more magnitude bits. At the end of the processing chain, the correlated signal with sign and magnitude bits is accumulated (integrated). After some predetermined time interval of accumulation, the sum is read out to close the code and carrier loops, and the accumulator is zeroed out for the next interval.

Now, we intend to demonstrate the equivalence of modifying the following signals: input signals; locally generated carrier signals; mixed signals; Early and Late reference signals; and correlated Early and Late signals. Indeed, equations (4) and (5) mix the input signal with a locally generated carrier signal and correlate the resulting signal with either Early or Late local code reference signal. The resulting signal is accumulated in the accumulator registers each sample clock for the entire predetermined interval period.

As was mentioned above, a drastic reduction in code multipath can be achieved by modifying the Early and Late local code reference signals at appropriate times. The modification of E and L local code signals can be achieved by logically adding using the (EX-OR) operation the additional signals A and B to the E and L unmodified local code signals in order to generate the modified $E_M$ and $L_M$ local code signals:

$$E_M = E(EX - OR)A \quad (6)$$
$$= (-)E \text{ only when } (A = 1 \text{ or logic high at times } t = t_A);$$

$$L_M = L(EX - OR)B \quad (7)$$
$$= (-)L \text{ only when } (B = 1 \text{ or logic high at times } t = t_B).$$

Thus, the modification operation using the A and B signals is equivalent to changing the sign of E and L local code signals at appropriate times.

We have the following equations for the modified E and L correlation signals at these particular times only:

Early modified correlation signal at certain time $t_A=(-) E$ local code$\times(I_S \times I_L-Q_S \times Q_L)$; (8)

Late modified correlation signal at certain time $t_B=(-) L$ local code$\times(I_S \times I_L-Q_S \times Q_L)$;tm (9)

However, when viewing from the perspective of equations (4) and (5), changing E local code signal to (−E) local code signal and L local code signal to (−L) local code signal at appropriate times can be replaced by changing any other signal in the equations (4–5) (input, carrier, mixing, or correlation) to its negative value at appropriate times.

Thus, for modified input signals we have the following equations:

$E$ modified correlation signal at certain time $t_A=E$ local code$\times$
  $((-)I_S \text{ input} \times I_L-(-)Q_S \text{ input} \times Q_L)$; (8a)

$L$ modified correlation signal at certain time $t_B=L$ local code$\times$
  $((-)I_S \text{ input} \times I_L-(-)Q_S \text{ input} \times Q_L)$; (9a)

For modified locally generated carrier signals we have the following equations:

$E$ modified correlation signal at certain time $t_A=E$ local code$\times$
  $((-)I_L \text{ local carrier} \times I_S-(-)Q_L \text{ local carrier} \times Q_S)$; (8b)

$L$ modified correlation signal at certain time $t_B=L$ local code$\times$
  $((-)I_L \text{ local carrier} \times I_S-(-)Q_L \text{ local carrier} \times Q_S)$. (9b)

For modified mixed signals we have the following equations:

$E$ modified correlation signal at certain time $t_A=E$ local code$\times$
  $(-)((I_L \times I_S-Q_L \times Q_S))$ mixing signal; (8c)

$L$ modified correlation signal at certain time $t_B=L$ local code$\times$
  $(-)((I_L \times I_S-Q_L \times Q_S))$ mixing signal. (9c)

And finally, for modified Early and Late correlation signals we have the following equations:

$E$ modified correlation signal at certain time $t_A=(-)\{E$ local code$\times$
  $(I_L \times I_S-Q_L \times Q_S)$ mixing signal$\}$; (8d)

$L$ modified correlation signal at certain time $t_B=(-)\{L$ local code$\times$
  $(I_L \times I_S-Q_L \times Q_S)$ mixing signal$\}$. (9d)

Mathematically, the (8), (8a), (8b), (8c), and (8d) equations are identical. Also, (9), (9a), (9b), (9c), and (9d) equations are identical. However, obtaining the change in sign in each of the above given cases involves the different architecture.

Indeed, according to equations (8), (8a), (8b), (8c), (8d) and (9), (9a), (9b), (9c), (9d) the multiplication, addition, and the change of sign operation can be performed at the same time. However, in practice, each step is performed at a different clock cycle, and afterwards is pipelined. Therefore, the modification signals for any specific implementation must be either delayed or advanced so that the net resulting signals become identical to the resulting signals described by the equations (8) and (9).

The standard signal processing configuration (100) is shown in FIG. 9. The sampled input signal (102) I is mixed with the local carrier signal (104) in the mixer (106) which results in the downconverted baseband (107) signal $I_B$. The local E code signal (108) and the local L signal (114) are combined in the circuit (112) to generate a local code signal ($\alpha E+\beta L$) (113), wherein $\alpha$ and $\beta$ are real values. The local code signal ($\alpha E+\beta L$) is correlated with the downconverted baseband (107) signal $I_B$ in the correlator (110) which results in the resulting signal (116) ($\alpha E+\beta L)I_B$.

In one embodiment according to FIG. 10, the additional signals A (122) and B (124) are generated at the input level. The implementation of an apparatus (140) in this embodiment is depicted in FIG. 11. The apparatus (140) comprises the following elements: (a) a tracking satellite channel circuit for tracking the composite signal from the satellite; and (b) an additional circuit for generating additional signals used to minimize the multipath distortion component of the composite signal.

The tracking satellite channel circuit of FIG. 11 includes the following elements: the input circuit (142); the local carrier generator (144); the complex mixer (146) for the Early channel; the complex mixer (148) for the Late channel; the Early reference code generator (160), the Late reference code generator (162); the Early code correlator (150); the Late code correlator (152); the Early Accumulate and Dump circuit (154); the Late Accumulate and Dump circuit (156); and the computer (158). The functioning of each element of the standard satellite tracking channel is well known to the person of the ordinary skill in the art. The additional signal (A) (164) and B (166) are introduced in this embodiment at the input level. As depicted in FIG. 11, the additional signal (A) is mixed with the sign bits of the inphase (I) input signal (168) in the EX-OR Gate (176) and is mixed with the sign bits of the quadrature (Q) input signal (172) in the EX-OR Gate (178). The additional signal (B) (166) is mixed with the sign bits of the inphase (I) input signal (168) in the EX-OR Gate (180) and is mixed with the sign bits of the quadrature (Q) input signal (172) in the EX-OR Gate (182).

At first we disclose the functioning of the Early channel Complex Mixer (146). The sign bits of the resulting modified input inphase (I) signal (186) and the magnitude bits (170) of the input unmodified inphase signal are mixed with both sign and magnitude bits of the inphase component of the locally generated carrier signal (145) in the Complex Mixer (146). Similarly, the sign bits of the resulting modified input quadrature (Q) signal (184) and the magnitude bits (174) of the input unmodified quadrature signal are mixed with both sign and magnitude bits of the quadrature component of the locally generated carrier signal (147) in the Complex Mixer (146).

The sign and magnitude bits of the resulting signal (151) are correlated with the Early reference code signal (160) in the Early Code Correlation circuit (150). The correlation resulting signal (155) is accumulated in the Early Accumulate and Dump circuit (154) and the resulting signal (161) is fed into the computer (158).

The performance of the Late channel Complex Mixer (148) is disclosed below. The sign bit of the resulting modified input inphase (I) signal (188) and the magnitude bits (170) of the input unmodified inphase signal are mixed with both sign and magnitude bits of the inphase component of the locally generated carrier signal (145) in the Complex Mixer (148). At the same time, the sign bit of the resulting modified input quadrature (Q) signal (190) and the magnitude bits (174) of the input unmodified quadrature (Q) signal are mixed with both sign and magnitude bits of the quadrature component of the locally generated carrier signal (147) in the Complex Mixer (148).

The sign and magnitude bits of the resulting signal (153) are correlated with the Late reference code signal (162) in the Late Code Correlation circuit (152). The correlation resulting signal (157) is accumulated in the Late Accumulate and Dump circuit (156) and the resulting signal (163) is fed into the computer (158). In one embodiment, both Early reference code signal (160) and Late reference code signal (162) are delayed to account for processing delays in the A and B additional input EX-OR circuits (176, 178, 180, 182). In another embodiment, when both A and B signal are generated by different circuits, the Early reference code signal (160) and the Late reference code signal (162) do not have to be delayed. The computer is also used to close the carrier and code loops and to optimize the additional A and B signals in order to minimize the contribution of the multipath signal into the received satellite composite signal.

In the alternative embodiment, as depicted in FIG. 12, the tracking satellite channel circuit (200) is modified at locally generated carrier level (202) and (204). The apparatus (210) for the second embodiment is shown in FIG. 13. In this embodiment, the additional signal (A) (212) and B (214) are introduced in this embodiment at the locally generated carrier level. As shown in FIG. 13, the additional signal (A) is mixed with the sign bits of the inphase (I) local carrier reference signal (216) in the EX-OR Gate (224) and is mixed with the sign bit of the quadrature (Q) component of the local carrier reference signal (220) in the EX-OR Gate (226). The additional signal (B) (214) is mixed with the sign bit of the inphase (I) component of the locally generated carrier reference signal (216) in the EX-OR Gate (228) and is mixed with the sign bit of the quadrature (Q) component of the locally generated carrier reference signal (220) in the EX-OR Gate (230).

In the Early channel, the sign bit of the inphase component of the modified local carrier reference signal (232) and the magnitude bits (234) of the inphase component of the unmodified local carrier signal are mixed with both sign and magnitude bits of the inphase component of the input sampled signal (254) in the Early Complex Mixer (250). Similarly, the sign bit of the quadrature component of the modified local carrier reference signal (236) and the magnitude bits (238) of the quadrature component of the unmodified local carrier reference signal are mixed with both sign and magnitude bits of the quadrature component of the input sampled signal (256) in the Early Complex Mixer (250). The further processing of the resulting signal (266) in the Early channel is the same as in the first embodiment depicted in FIG. 11 and disclosed above.

In the Late channel, the sign bit of the inphase component of the modified local carrier reference signal (240) and the magnitude bits (242) of the inphase component of the unmodified local carrier signal are mixed with both sign and magnitude bits of the inphase component of the input sampled signal (258) in the Late Complex Mixer (252). Similarly, the sign bit of the quadrature component of the modified local carrier reference signal (244) and the magnitude bits (246) of the quadrature component of the unmodified local carrier reference signal are mixed with both sign and magnitude bits of the quadrature component of the input sampled signal (260) in the Late Complex Mixer (252). Again, the further processing of the resulting signal (268) is the same as in the disclosed above first embodiment depicted of FIG. 11.

Both Early reference code signal (282) and Late reference code signal (284) may need to be delayed (see discussion above) to account for processing delays in the A and B additional local carrier EX-OR circuits (224, 226, 228, 230). In this embodiment, the computer is also used to close the carrier and code loops and to optimize the additional A and B signals in order to minimize the contribution of the multipath signal into the received satellite composite signal.

In one more embodiment of the present invention, the carrier mixed signal is modified as shown in FIG. 14. Indeed, an additional signal A (312) modifies the signal (314) generated by the Complex Mixer (306) in the Early channel, wherein an additional signal B (320) modifies the same signal (314) in the Late channel. The further processing of signals in the Early and Late channels are disclosed above in the first and the second embodiments of the present invention.

Yet, in another embodiment of the present invention relates to modification of signals at the local reference code level as depicted in FIG. 15. In this embodiment, an additional A signal (410) modifies the locally generated Early reference code signal (412), wherein an additional B signal (416) modifies the locally generated Late code reference signal (418). The further processing of the composite satellite signal in this embodiment is similar to the standard tracking channel architecture.

Finally, one more additional embodiment of the present invention shown in FIG. 16 utilizes the additional signal A (524) to modify the sign bit (526) of an Early correlated signal and employs the additional signal B (523) to modify the sign bit (534) of a Late correlated signal in order to minimize the multipath component of the received satellite composite signal. In one embodiment, the Early code reference signal and the Late code reference signal are advanced to account for processing delays in the A and B additional EX-OR circuits (550, 552). The rest of the architecture of apparatus of FIG. 16 comprises the standard tracking channel architecture.

In the preferred embodiment, the A and B additional signals employed in each of the above-given five embodiments can be generated using a generator of additional signals (600) depicted in FIG. 17. The generator (600) includes the following elements: (1) a code NCO & Generator (601) for generating a local code signal (620 of FIG. 18); (2) an Early flip-flop (602) for generating an Early signal (622 of FIG. 18); (3) a Punctual flip-flop (604) for generating a Punctual signal (624 of FIG. 18); (4) a Late flip-flop (606) for generating a Late signal (626 of FIG. 18); a Late-Late flip-flop (608) for generating a Late-Late signal (628 of FIG. 18); a first EX-OR gate (610) for generating a (B) additional signal (636 of FIG. 18); and a second EX-OR gate (612) for generating an (A) additional signal (630 of FIG. 18).

The (E–L) composite transfer function with minimum multipath component for the optimum A and B signals, that is the best mode of the present invention, is shown in FIG. 19. In the best mode, the multipath is minimized and is present only for small and large delays.

FIG. 20 illustrates the (E–L) composite transfer function for not optimum additional signals A and B. In this mode of the invention the composite transfer function includes the greater multipath component (as compared with the best mode) for small as well as for large delays.

The present invention also includes a method for decoding a composite signal (CS) that includes a multipath distortion component. The method comprises the following steps: (1) tracking the satellite signal by a tracking channel; (2) generating additional signals by an additional circuit; and (3) minimizing the multipath distortion component by optimizing the additional signals by a computer.

In the first embodiment, the step of tracking the satellite signal by the tracking channel further comprises the steps of: (1) processing the input composite signal from the satellite; (2) generating an inphase (I) component of the input composite signal; and (3) generating a quadrature (Q) component of the input composite signal. In this embodiment, the step of generating additional signals by the additional circuit further includes the steps of: (4) modifying the inphase (I) component of the input composite signal at input level; and (5) modifying the quadrature (Q) component of the input composite signal at input level.

In the second embodiment, the step of tracking comprises the steps of: (1) generating an inphase component (I) of a local carrier reference signal; (2) generating a quadrature component (Q) of a local carrier reference signal. In this embodiment, the step of generating additional signals further includes the steps of: (3) modifying the inphase (I) component of the local carrier reference signal; and (4) modifying the quadrature (Q) component of the local carrier reference signal.

In the third embodiment, the step of tracking the satellite signal further comprises the steps of: (1) mixing an inphase component (I) and a quadrature component (Q) of a locally generated carrier signal with an inphase (I) component and a quadrature component (Q) of the input sampled signal; and (2) generating an inphase (I) component of a baseband sampled composite signal. In this embodiment, the step of generating additional signals by the additional circuit further includes the steps of: (3) modifying the inphase I component of the baseband sampled composite signal; (4) generating an Early baseband sampled composite signal; (5) modifying the inphase (I) component of the baseband sampled composite signal; and (6) generating a Late baseband sampled composite signal.

In the fourth embodiment, the step of tracking the satellite signal by the tracking channel includes the steps of: (1) locally generating an Early code reference signal; and (2) locally generating a Late code reference signal. The step of generating additional signals by the additional circuit further includes the steps of: (3) modifying the Early code reference signal; and (4) modifying the Late code reference signal.

Finally, in the fifth embodiment, the step of tracking the satellite signal by the tracking channel further comprises the steps of: (1) correlating the inphase (I) component of the baseband sampled composite signal with the locally generated Early code reference signal; (2) generating an Early component of a composite correlation signal; (3) correlating an inphase (I) component of the baseband sampled input composite signal with the locally generated Late code reference signal; and (4) generating a Late component of a composite correlation signal. The step of generating additional signals by the additional circuit further includes the steps of: (5) modifying the Early component of the composite correlation signal; and (6) modifying the Late component of the composite correlation signal.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for use in decoding a composite signal including a satellite signal from a satellite and including a multipath distortion component, said apparatus comprising:

a tracking satellite channel circuit for tracking said composite signal from said satellite during at least two chip time periods and wherein said composite signal is received during at least two said chip time periods; and an additional circuit connected to said tracking satellite channel circuit for generating at least one additional signal;

wherein each said additional signal is used to minimize said multipath distortion component during at least two said chip time periods.

2. The apparatus of claim 1;

wherein said tracking satellite channel circuit further comprises:

an inphase (I) input circuit for processing said input composite signal from said satellite and for generating an inphase (I) component of said input composite signal; and a quadrature (Q) input circuit for processing said input composite signal from said satellite and for generating a quadrature (Q) component of said input composite signal; and wherein said additional circuit further includes:
an additional input (A) circuit connected to said inphase (I) input circuit for modifying said inphase (I) component of said input composite signal at input level; and
an additional input (B) circuit connected to said quadrature (Q) input circuit for modifying said quadrature (Q) component of said input composite signal at input level.

3. The apparatus of claim 1;
wherein said tracking satellite channel circuit further comprises:
an inphase (I) local carrier reference circuit for generating an inphase component (I) of a local carrier reference signal; and
a quadrature (Q) local carrier reference circuit for generating a quadrature component (Q) of a local carrier reference signal;
and wherein said additional circuit further includes:
an additional local carrier reference (A) circuit connected to said inphase (I) local carrier reference circuit for modifying said inphase (I) component of said local carrier reference signal; and
an additional local carrier reference (B) circuit connected to said quadrature (Q) local carrier reference circuit for modifying said quadrature (Q) component of said local carrier reference signal.

4. The apparatus of claim 1;
wherein said tracking satellite channel circuit further comprises:
a complex mixer circuit for mixing an inphase component (I) and a quadrature component (Q) of a locally generated carrier signal with an inphase (I) component and a quadrature component (Q) of an input sampled signal and for generating an inphase (D component of a baseband sampled composite signal; and
wherein said additional circuit further includes:
an additional local carrier mixing (A) circuit connected to said inphase (I) local carrier mixing circuit for modifying said inphase (I) component of said baseband sampled composite signal and for generating an Early baseband sampled composite signal; and
an additional local carrier mixing (B) circuit connected to said input (I) local carrier mixing circuit for modifying said inphase (I) component of said baseband sampled composite signal and for generating a Late baseband sampled composite signal.

5. The apparatus of claim 1;
wherein said tracking satellite channel circuit further comprises:
an Early code reference circuit for locally generating an Early code reference signal; and
a Late code reference circuit for locally generating a Late code reference signal; and
wherein said additional circuit further includes:
an additional local code reference (A) circuit connected to said Early code reference circuit for modifying said Early code reference signal; and
an additional local code reference (B) circuit connected to said Late code reference circuit for modifying said Late code reference signal.

6. The apparatus of claim 1;
wherein said tracking satellite channel circuit further comprises:
an Early code correlation circuit for correlating an inphase (I) component of a baseband sampled composite signal with a locally generated Early code reference signal and for generating an Early component of a composite correlation signal; and
a Late code correlation circuit for correlating an inphase (I) component of said baseband sampled input composite signal with a locally generated Late code reference signal and for generating a Late component of a composite correlation signal; and
wherein said additional circuit further includes:
an additional correlation (A) circuit connected to said Early code correlation circuit for modifying said Early component of said composite correlation signal; and
an additional correlation (B) circuit connected to said Late code correlation circuit for modifying said Late component of said composite correlation signal.

7. The apparatus of claim 1;
wherein said additional circuit further includes:
a code NCO & Generator for generating a local code signal;
an Early flip-flop connected to said code NCO & Generator for generating an Early signal;
a Punctual flip-flop connected to said Early flip-flop for generating a Punctual signal;
a Late flip-flop connected to said Punctual flip-flop for generating a Late signal;
an Late-Late flip-flop connected to said Late flip-flop for generating a Late-Late signal;
a first EX-OR gate connected to said Code NCO & Generator and connected to said Early flip-flop for generating a (A) additional signal; and
a second EX-OR gate connected to said Late flip-flop and connected to said Late-Late flip-flop for generating an (B) additional signal.

8. The apparatus of claim 1 further comprising:
a computer for closing a code and a carrier tracking loops, and for minimizing said multipath distortion component by optimizing said additional signals.

9. A method for decoding a composite signal including a satellite signal and a multipath distortion component, said method comprising the steps of:
tracking said satellite signal by a tracking channel during at least two chip time periods;
generating additional signals by an additional circuit; and
minimizing said multipath distortion component by optimizing said additional signals by a computer during at least two said chip time periods.

10. The method of claim 9;
wherein said step of tracking said satellite signal by said tracking channel further comprises the steps of:
processing said input composite signal from said satellite;
generating an inphase (I) component of said input composite signal; and
generating a quadrature (Q) component of said input composite signal;
and wherein said step of generating additional signals by said additional circuit further includes the steps of:
modifying said inphase (I) component of said input composite signal at input level; and
modifying said quadrature (Q) component of said input composite signal at input level.

11. The method of claim 9;
wherein said step of tracking said satellite signal by said tracking channel further comprises the steps of:
generating an inphase component (I) of a local carrier reference signal; and
generating a quadrature component (Q) of a local carrier reference signal;
and wherein said step of generating additional signals by said additional circuit further includes the steps of:
modifying said inphase (I) component of said local carrier reference signal; and
modifying said quadrature (Q) component of said local carrier reference signal.

12. The method of claim 9;
wherein said step of tracking said satellite signal by said tracking channel further comprises the steps of:
mixing an inphase component (I) and a quadrature component (Q) of a locally generated carrier signal with an inphase (I) component and a quadrature component (Q) of said input sampled signal; and
generating an inphase (I) component of a baseband sampled composite signal;
and wherein said step of generating additional signals by said additional circuit further includes the steps of:
modifying said inphase (I) component of said baseband sampled composite signal;
generating an Early baseband sampled composite signal;
modifying said inphase (I) component of said baseband sampled composite signal; and
generating a Late baseband sampled composite signal.

13. The method of claim 9;
wherein said step of tracking said satellite signal by said tracking channel further comprises the steps of:
locally generating an Early code reference signal; and
locally generating a Late code reference signal;
and wherein said step of generating additional signals by said additional circuit further includes the steps of:
modifying said Early code reference signal; and
modifying said Late code reference signal.

14. The method of claim 9;
wherein said step of tracking said satellite signal by said tracking channel further comprises the steps of:
correlating an inphase (I) component of a baseband sampled composite signal with a locally generated Early code reference signal;
generating an Early component of a composite correlation signal; correlating an inphase (I) component of said baseband sampled input composite signal with a locally generated Late code reference signal; and
generating a Late component of a composite correlation signal;
and wherein said step of generating additional signals by said additional circuit further includes the steps of:
modifying said Early component of said composite correlation signal; and
modifying said Late component of said composite correlation signal.

* * * * *